Aug. 5, 1969    G. R. BRENCHLEY    3,459,304
PHOTOSENSITIVE FLUID MONITORING DEVICE
Filed Dec. 8, 1966    4 Sheets-Sheet 1

INVENTOR.
GEORGE R. BRENCHLEY
BY
Dean Sandford
ATTORNEY

Aug. 5, 1969  G. R. BRENCHLEY  3,459,304
PHOTOSENSITIVE FLUID MONITORING DEVICE
Filed Dec. 8, 1966  4 Sheets-Sheet 2

INVENTOR.
GEORGE R. BRENCHLEY
BY
Dean Sandford
ATTORNEY

Aug. 5, 1969  G. R. BRENCHLEY  3,459,304
PHOTOSENSITIVE FLUID MONITORING DEVICE
Filed Dec. 8, 1966  4 Sheets-Sheet 3

INVENTOR.
GEORGE R. BRENCHLEY
BY
Dean Sandford
ATTORNEY

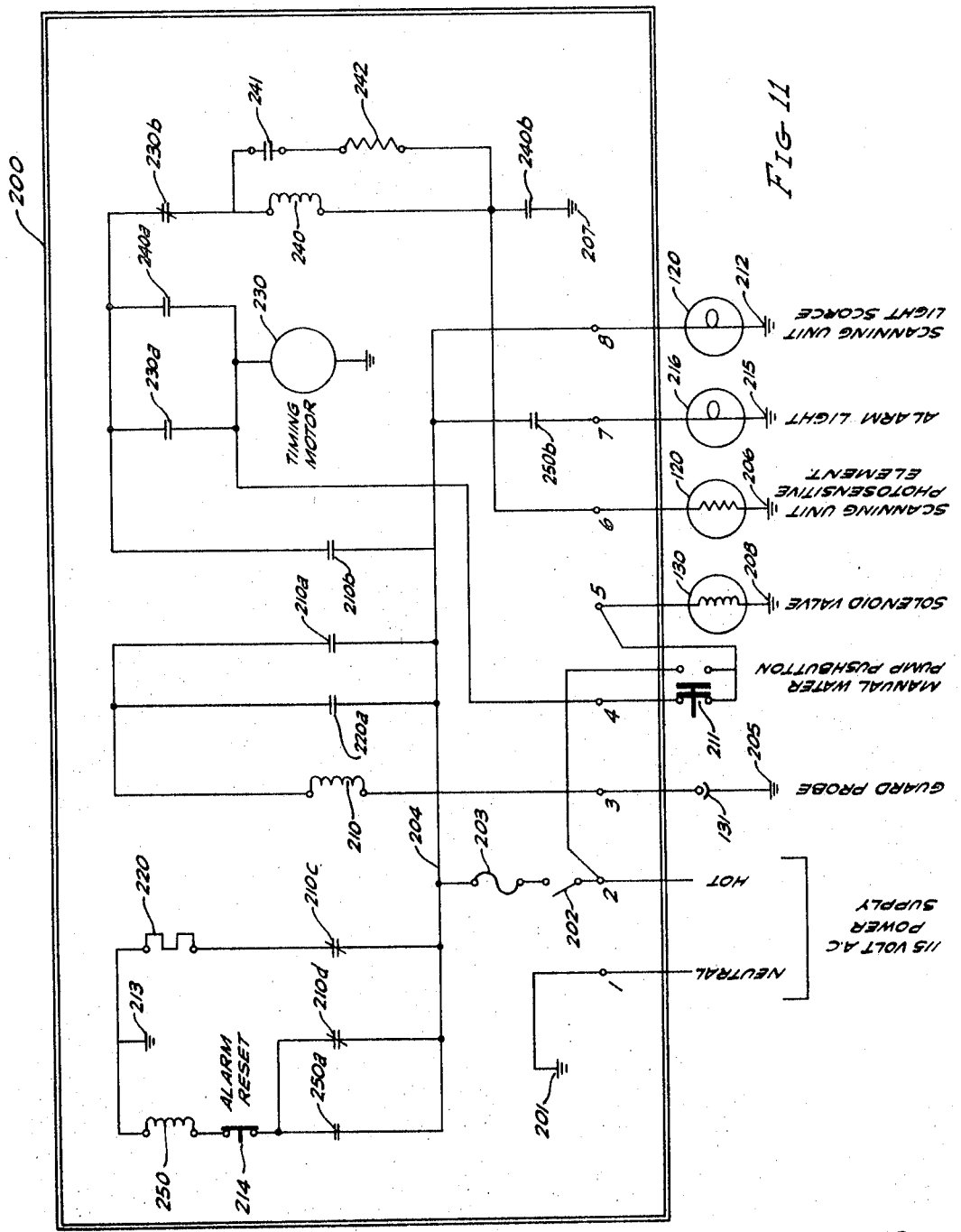

United States Patent Office 3,459,304
Patented Aug. 5, 1969

3,459,304
PHOTOSENSITIVE FLUID MONITORING DEVICE
George R. Brenchley, 14740 E. Broadway,
Whittier, Calif. 90604
Filed Dec. 8, 1966, Ser. No. 600,253
Int. Cl. G01n 21/24; B01d 21/24
U.S. Cl. 210—93                                 18 Claims

ABSTRACT OF THE DISCLOSURE

Disclosed is an apparatus for detecting the opacity of a fluid comprising a hollow body having two opposed openings thereinto. A pair of hollow tubes having transparent end closures protruding inwardly into the body so that the transparent ends of the tubes are in opposed spaced relationship. A light source is mounted in one of the tubes and a photosensitive element in the other tube. The apparatus is disclosed as controlling the oil-water interface level of an oil-water separator.

---

This invention relates to a device for monitoring the opacity of a fluid, and more particularly, to a photosensitive device adapted to detect a change in the composition of a fluid by measuring variations in the amount of light transmitted through a body of the fluid. The photosensitive monitoring device of this invention is particularly adapted to the detection of the oil-water interface level in an oil-water separator.

Heretofore various devices have been proposed which are adapted to measure the amount of light transmitted through a body of fluid. These devices generally comprise a light source and a photosensitive element arranged on the opposite sides of a body of fluid. A device of this type can be employed to monitor fluid composition or quality where a change in the composition or quality of the fluid is accompanied by a change in the ability of the fluid to transmit light. Also, such devices have use in detecting a change in fluid type providing the various fluids are distinguished by different opacities.

However, previous efforts to adapt these devices to monitor a fluid stream continuously flowing at an elevated pressure have not been entirely satisfactory. One difficulty experienced with devices adapted to operate at an elevated pressure is that heavy shields or walls of translucent material must be employed to withstand the fluid pressure. Even though transparent materials are employed in this construction, the light transmission is significantly affected. Where the light adsorption by the walls of the fluid chamber is significantly large with respect to the changes in the light adsorptivity of the fluid, sensitivity will be adversely affected.

Accordingly, it is an object of the present invention to provide a photosensitive device suitable for monitoring a continuous fluid stream at an elevated pressure. Another object is to provide a photosensitive fluid monitoring device having a high sensitivity. Still another object is to provide a photosensitive fluid monitoring device adapted to distinguish between oil and water. A further object is to provide means for controlling the oil-water interface in a liquid separator. These and other objects will be apparent from the following description.

Briefly, the fluid monitoring device of this invention comprises a scanning unit for installation in a fluid conduit, and a control unit which can be located remote from the scanning unit and connected thereto by electric conductors. The scanning unit is provided with a light source mounted in a tube having a transparent end face and a photosensitive element is mounted in a similar opposed tube. The monitored fluid passes between the end faces of the opposed tubes, the spacing between which can be varied as one means of adjusting the sensitivity of the unit. The amount of light transmitted from the light source through the body of fluid between the opposed end faces is detected by the photosensitive element. The fluid monitoring device of this invention can be adapted for monitoring a liquid interface level by circulating material from the interface through the scanning unit.

The invention will be more fully understood from the following detailed description and the accompanying drawings, in which:

FIGURE 11 is a schematic electrical diagram of a control unit adapted to control the level of an oil-water interface.

Figure 1:
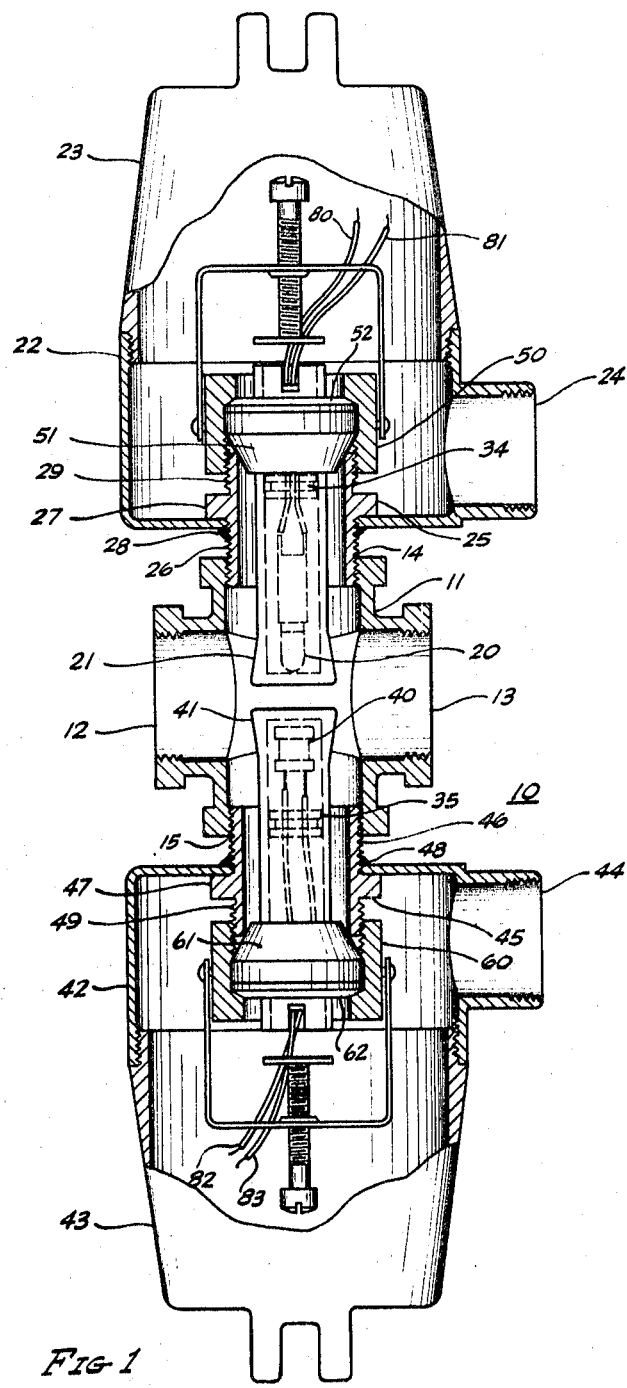
FIGURE 1 is a partial cross-sectional view of a scanning unit according to this invention.

Referring now to FIGURE 1, scanning unit 10 comprises a cruciform body 11 having openings 12, 13, 14 and 15 arranged in a common plane at 90 degree angles. Opposed openings 12 and 13 are adapted for connection to a fluid conduit by threaded, flanged, socket weld, or other suitable connections. The cruciform configuration of body 11 is adapted for mounting a light source and photosensitive element normal to the fluid connections and opposed to each other. In the illustrated embodiment, cruciform body 11 is a threaded pipe cross having four internally threaded branches.

The light source is comprised of electric light 20 inserted into tube 21 and fluid-tightly mounted in branch opening 14 of body 11. Similarly, photosensitive element 40 is inserted into tube 41 and fluid-tightly mounted in branch opening 15 of body 11. Thus, tubes 21 and 41 protrude into the interior of body 11 to afford housings for electric light 20 and photosensitive element 40 proximate each other, yet outside of the fluid environment. In this manner, the structural mounting contributes a minimum interference to the transmission of light from electric light 20 to photosensitive element 40. Also, the cylindrical shapes of the tubes 21 and 41 afford maximum strength, thereby permitting minimum wall thickness. Electric light 20 and photosensitive element 40 are supported in tubes 21 and 41, respectively, by rubber grommets 34 and 35 which slip into the interior of the tubes.

Fluid entering branch opening 12 passes through body 11 and exits through branch opening 13, the bulk of the fluid flowing around the intruding tubes 21 and 41 with a smaller proportion passing through the gap between the ends of the opposed tubes. Light emitted by electric light 20 passes through the transparent end of tube 21, through the body of fluid in the gap between tube 21 and tube 41, and finally through the transparent end of tube 41, whereupon it registers upon photosensitive element 40.

Figure 2:
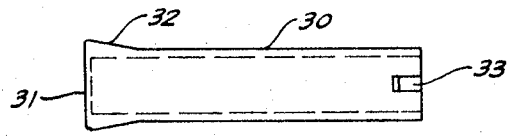
FIGURE 2 is a detail showing a side view of a tube for mounting the light source and photosensitive element.

Tubes 21 and 41 are of similar construction, and comprise a cylindrical tubular section having a closed end. The tubular section can be of opaque construction with the end piece being constructed of transparent material. Alternatively, the entire tube can be constructed of transparent material, such as glass or plastic. One preferred tube of integral glass construction is illustrated in FIGURE 2. In this embodiment, tubular section 30 is integrally formed with end closure 31, the tube wall being thickened somewhat at 32 to provide increased strength at the juncture of tubular section 30 with end closure 31. End closure 31 is preferably flat so that the distance between the ends of opposed tubes 21 and 41 will be uniform over the entire end face. Slot 33 is provided in the tube wall at the open end to accommodate the passage of electric conductors in a manner to be more fully described. Further it is preferred that the end closure 31 be provided with a coating of silica on its exterior surface to reduce the tendency for fluids to adhere thereto and produce a faulty determination of the opaqueness of the fluid being monitored.

Referring again to FIGURE 1, the open ends of tubes 21 and 41 terminate in electrical boxes 22 and 42 respectively, such as the standard explosion proof fittings illustrated. Each box is fitted with threaded cover 23 and 43, respectively, and means 24 and 44 respectively, for engaging an electrical conduit. Tube 21 is mounted in branch opening 14 of body 11 by means of threaded adapter 25. Adapter 25 is provided with male threads at 26 to engage the female threads of branch opening 14. Adapter 25 is inserted through an opening in the bottom of electrical box 22, until protruding shoulder 27 is in contact with the box, and affixed thereto by seal welding or brazing, as at 28. Adapter 25 is also provided with male threads 29 at its opposite end for engagement of retainer 50. Similarly, tube 41 is mounted in branch opening 15 of body 11 by means of threaded adapter 45. Adapter 45 is provided with male threads 46 to engage the female threads of branch opening 15. Adapter 45 is inserted through an opening in the bottom of electrical box 42 until protruding shoulder 47 is in contact with the box, and permanently affixed thereto by seal welding or brazing as at 48. Adapter 45 is provided with male threads 49 at its opposite end for engagement of retainer 60.

Figure 3:
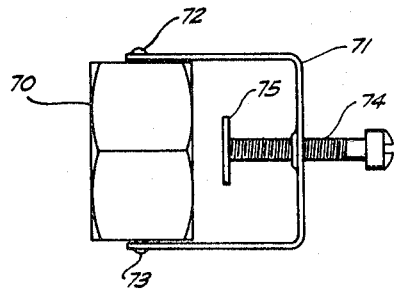
FIGURE 3 is a detail showing a side view of a retainer adapted to maintain the mounting tube in position.
Figure 4:
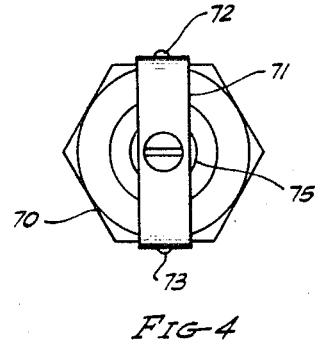
FIGURE 4 is a detail showing an end view of the retainer.

Retainers 50 and 60 are similar locking devices adapted to threadably engage the threads 29 and 49 of adapters 25 and 45, respectively. As illustrated in FIGURES 3 and 4, these retainers comprise nut 70 having bail 71 attached thereto by means of pins 72 and 73. Bail 71 is adapted to receive threaded bolt 74 having plate 75 attached at its end to engage tube 21 or 41, respectively. Bolt 74 provides adjustment of the spacing between tubes 21 and 41, and maintains the tubes in position against the outward force of the fluid pressure exerted on the tube. Electrical conductors 80 and 81 pass through the slot in tube 21, and the conductors 82 and 83 through the slot in tube 41, so that the plate 75 can bear against the open ends of the respective tubes. The conductors 80 and 81 terminate in the box 22, and the conductors 82 and 83 in the box 42, and are adapted to connection to other conductors by conventional means.

Figure 5:
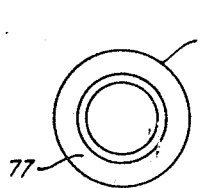
FIGURE 5 is a detail showing an end view of a seal ring adapted to seal the tube mountings.
Figure 6:
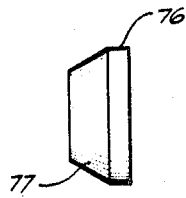
FIGURE 6 is a detail showing a side view of the seal ring.
Figure 7:
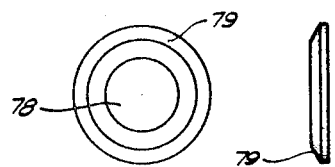
FIGURE 7 is a detail showing an end view of a seal ring washer.
Figure 8:
FIGURE 8 is a detail showing a side view of the seal ring washer.

Fluid leakage around the tubes 21 and 41 is prevented by rubber seal rings 51 and 61, respectively, which are held in place by retainers 50 and 60 bearing against washers 52 and 62. As illustrated in FIGURES 5 and 6, seal rings 51 and 61 comprise a ring shaped body 76 having a beveled face 77. The inside diameter of the ring is such that it snugly fits around the tubes 21 and 41. Washers 52 and 62, illustrated in FIGURES 7 and 8, comprise circular disks having a concentric hole 78 of sufficient diameter to pass over the tubes 21 and 41, and having beveled face 79 to engage an interior beveled face in the locking nut 70 of retainers 50 and 60. Referring again to FIGURE 1, as the retainer 50 threadably engages the adapter 25, it bears against washer 52 compressing seal ring 51 against adapter 25 and around tube 21, thereby effecting a fluid tight seal. Similarly, tube 41 is sealed by retainer 60 bearing against washer 62 so as to compress seal ring 61 against adapter 45 and around tube 41.

In operation, light emitted from the electric light 20 passes through the fluid body flowing between the end faces of tubes 21 and 41 and registers upon photosensitive element 40. In one embodiment, photosensitive element 40 is of the type wherein an increase in the adsorbed light effects a decrease in its electrical resistance. Accordingly, an increase in fluid opacity results in a reduction in the light incident upon the photosensitive element and effects an increase in the resistance of the element. This change in resistance can be measured by conventional means, e.g., such as by measuring the current flow at constant potential across the element. Thus, in the simplest embodiment, the control unit can merely comprise means for measuring the resistance of the photosensitive element in the scanning unit. Alternatively, the control unit can also contain systems for performing various control functions.

Figure 9:
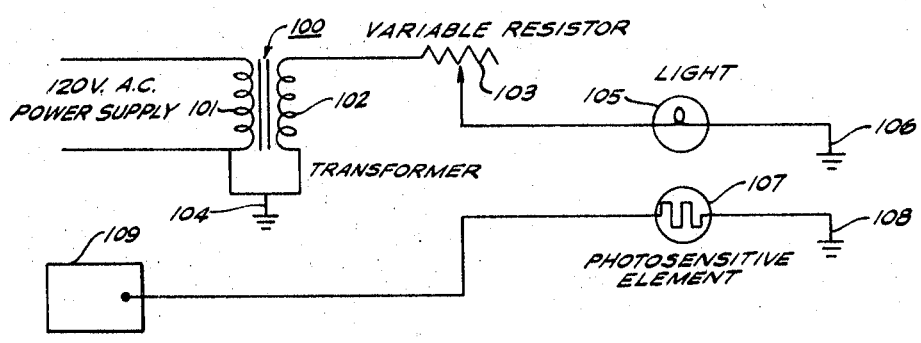
FIGURE 9 is a schematic electrical diagram of the scanning unit.

A schematic wiring diagram of the scanning unit is illustrated in FIGURE 9. A standard 120 volt AC power supply is connected across the primary side 101 of transformer 100. The secondary side 102 of the transformer is connected to one leg of variable resistor 103. The transformer neutrals are grounded at 104. Light 105 is connected to the other leg of resistor 103 and to ground at 106. Photosensitive element 107 is connected to ground at 108 and to a resistance measuring means 109. The intensity of light 105 can be regulated by adjustment of variable resistor 103 depending upon the opacity of the fluid monitored. The resistance of photosensitive element 107, as measured by resistance measuring means 109 is a relative indication of the opacity of the measured fluid.

Figure 10:
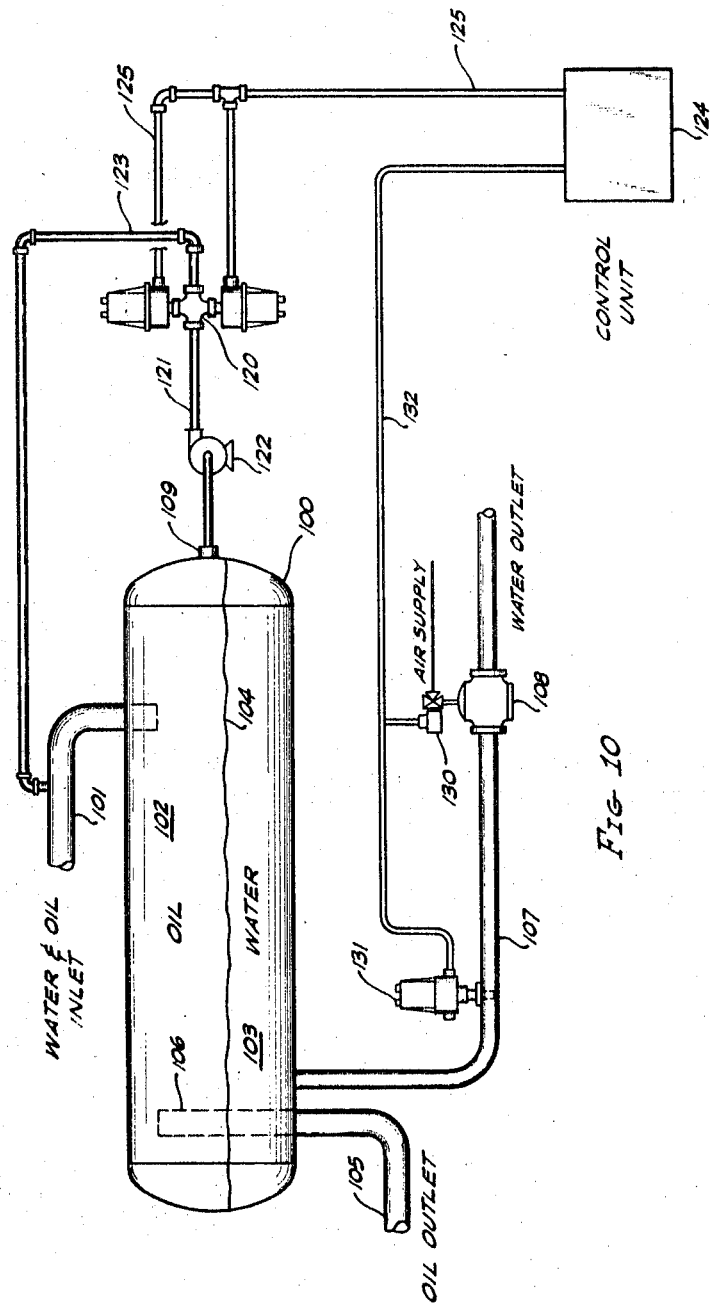
FIGURE 10 is a schematic diagram of a fluid monitoring device according to the present invention adapted to control the level of an oil-water interface.

The installation of a photosensitive fluid monitoring device according to this invention in an oil-water interface level control application is schematically illustrated in FIGURE 10. In this application, an oil-water mixture, such as a produced crude or other water-containing oil, enters separator drum 100 through inlet conduit 101. The entering oil-water mixture separates into an upper oil phase 102 and a lower water phase 103 by gravity separation. The boundary between oil phase 102 and water phase 103 is illustrated by interface 104. Dry oil is withdrawn from upper phase 102 through oil outlet conduit 105 having an internal standpipe 106. Water is withdrawn from lower phase 103 through water outlet conduit 107, having water dump valve 108 therein. The illustrated embodiment of oil-water separator has a substantially continuous inlet and dry oil outlet flow, with the water level being operated on batch control. In other words, the water phase 103 is allowed to accumulate until the interface 104 reaches a predetermined level whereupon valve 108 is opened and water withdrawn until interface 104 is lowered sufficiently that dry oil is again present at the control point. Water withdrawal is disconnected by closing valve 108 until the interface level raises to the control point. It is conventional to operate separator 100 at an elevated pressure. Thus fluids can usually be withdrawn without the necessity of pumping.

The interface level is controlled by a fluid monitoring device in accordance with the present invention, comprising scanning unit 120 of the type heretofore described and control unit 124. A small stream of fluid is withdrawn from drum 100 through nozzle 109 and circulated through scanning unit 120 by conduit 121 and pump 122. Fluid exciting scanning unit 120 is returned to inlet conduit 101 via conduit 123. Alternatively, the fluid exciting the monitoring device can be drained to a sump or other lower pressure system eliminating the need for pump 122. The opacity of the withdrawn fluid is measured by electrical circuitry contained in control unit 124. Scanning unit 120 is connected to control unit 124 by means of electric conductors passing through conduit 125. Solenoid valve 130 and guard probe 131 are also electrically connected to control unit 124 by means of conductors in conduit 132. When water is detected passing through scanning unit 120, as evidenced by a change in opacity, solenoid valve 130 is energized to supply air to the diaphram of valve 108 causing it to open and allowing water to drain from the separator. Upon the water phase 103 being sufficiently withdrawn that oil is again detected passing through scanning unit 120, as evidenced by a change in opacity, solenoid valve 130 is de-energized allowing the air pressure to bleed from the diaphragm of valve 108 causing it to close so as to stop the flow of water from the separator. Guard probe 131 is an optional safety feature which detects a change in the electrical conductivity of the fluid in water outlet conduit 107. In the event that the relatively high conductivity water is replaced by relatively low conductivity oil, solenoid valve 130 is de-energized allowing valve 108 to close and also sounding an alarm. A time delay can be provided before the water draw is closed, thus preventing shutdown by transient signals. In one embodiment, the unit remains shut down until manually reset; while in another embodiment, the unit will be automatically reset. If there is again water at guard probe 131, the unit will go back to its normal functioning state except that an alarm light will remain energized to inform the operator that there has been a malfunction of some nature. When the problem has been resolved, the operator can reset the alarm light.

One embodiment of electrical circuitry for automatic operation of the above described oil-water separator is schematically illustrated in FIGURE 11. In this embodiment, the presence of water at scanning unit 120 initiates a control action which causes water dump valve 108 to open for a predetermined timed period, so long as oil is not present in water outlet conduit 107. At the end of the timed period, valve 108 is closed unless water is again detected at the monitoring device, in which case the timed period is repeated. The timing period should be set substantially shorter than the time required to drain the water phase 103 to prevent complete draining of the water level during a normal timed period. The circuitry illustrated enclosed by the box 200 is internal to the control unit. The external components outside of the box 200 are electrically connected to the internal circuitry through the terminals numbered 1 through 8.

Referring particularly to FIGURE 11, a standard 115 volt AC power supply is connected to terminals 1 and 2, neutral terminal 1 being connected to ground at 201 and power being distributed by conductor 204 connected to terminal 2 through disconnect switch 202 and fuse 203. Relay 210 is connected to terminal 3 and to conductor 204 through parallel relay contacts 210a and 220a. When guard probe 131 senses the presence of water in conduit 107, relay 210 is energized through contact 220a, closing normally open contact 210a to provide a holding circuit from conductor 204, through relay 210, contact 210a and guard probe 131 to ground at 205. This circuit remains closed so long as water is present at the guard probe. When relay 210 is energized, normally open contact 210b is also closed to provide power from conductor 204 to the timing motor circuit. Thus, with water present at guard probe 131 and relay 210 energized, timing motor 230 can be energized when water is detected at scanning unit 120.

The photosensitive element of scanning unit 120 is connected to terminal 6 and to ground at 206. The device's light source is connected to terminal 8 and to ground at 212. With relatively opaque oil at scanning unit 120, the light incident on the photosensitive element of the scanning unit is relatively low and the corresponding resistance of the element is sufficiently high that the current flow through this circuit is insufficient to close relay 240. When water is present at the fluid monitoring device, the light incident on the photosensitive element increases causing a corresponding reduction in its resistance. When the current flow through relay 240 is increased sufficiently to cause it to close, normally open contact 240a is closed starting timing motor 230, and normally open contact 240b is closed to ground at 207 to provide a good circuit to maintain relay 240 closed. Matched capacitor 241 and resistor 242 are placed in a shunt circuit around relay 240 to prevent relay 240 from transient operation. When timing motor 230 is started, normally open holding contact 230a is closed to maintain the motor energized, and normally closed contact 230b is opened to de-energize relay 240, opening contact 240a in the motor starting circuit and contact 240b to ground. Simultaneously with the starting of timing motor 230, a circuit is completed through terminal 4, normally closed push button 211, terminal 5, and solenoid valve 130 to ground at 208. As previously disclosed, air is supplied to the diaphragm of water dump valve 108 by energizing solenoid valve 130, causing the dump valve to open and allowing water to drain from the separator. This condition is continued during the timing period of motor 230, which can be set at any convenient value, such as a period of about 3 minutes. On timing motor 230 completing its cycle, a cam action opens contact 230a breaking the circuit to the timing motor and to solenoid valve 130. Also, contact 230b is closed; which, if water continues to be present at scanning unit 120, again initiates the preceding cycle causing water to be drained for another timed period.

Guard probe 131 serves as a safety device. At any time oil is present at the guard probe, the circuit through relay 210 is broken, de-energizing the relay and opening contact 210b which stops the timing motor and causes the water dump valve to immediately close. Simultaneously therewith, normally closed relay contacts 210c and 210d are closed, completing a circuit from conductor 204 through relay 220 to ground at 213, and also through normally colsed push button switch 214 and alarm relay 250 to ground at 213. Alarm light 216 is connected to terminal 7 and to ground at 215. On being energized, relay 250 is actuated causing normally open holding contact 250a to close, and also closing contact 250b in the alarm light circuit. Thus, when oil is detected at guard probe 131, relay 250 is energized, maintaining alarm light 216 lit until alarm reset switch 214 is opened.

Relay 220 provides automatic restarting of the system after a shutdown by relay 210. When relay 210 is de-energized by the presence of oil at guard probe 131, normally closed contact 210c is closed energizing relay 220, which is of the type that actuates a pre-set time after being energized. Thus, a pre-set time after relay 210 is de-energized, relay 220 is actuated closing normally open contact 220a and again energizing relay 210. If water is present at guard probe 131, the circuit is completed and the system is returned to operation, only the alarm light remaining lit to indicate a shutdown. This automatic re-starting is an optional feature that can, of course, be omitted; in which case, the unit remains shutdown until manually restarted.

Manual water dump pushbutton switch 211 is another optional feature. In the normally closed position, switch 211 connects terminal 4 and 5 to complete the normal control circuit. However, when in the open position, pushbutton 211 connects power terminal 2 to terminal 5 to manually open the water drain valve.

Thus, while a preferred embodiment of this invention has been described, it will be obvious to those skilled in the art that it is not so limited, but is susceptible of various changes and modifications without departing from the spirit thereof.

Having now described the invention, I claim:
1. An apparatus for detecting the opacity of a fluid, which comprises:
   a hollow body having two opposed openings thereinto;

a pair of hollow tubes having transparent end closures, one of said tubes being fluid-tightly mounted in each of said opposed openings, said tubes protruding inwardly into said body so that the transparent ends of said tubes are in opposed spaced relationship;

a light source mounted in one of said tubes; and a photosensitive element mounted in the other of said opposed tubes.

2. The apparatus defined in claim 1 wherein said hollow body has a cruciform configuration.

3. The apparatus defined in claim 1 wherein said hollow tubes are glass cylinders having the transparent end closure formed integrally therewith.

4. The apparatus defined in claim 1 wherein said hollow tubes are adjustably mounted within said opposed openings so that the spacings between the opposed end faces of said tubes can be varied.

5. The apparatus defined in claim 1 wherein the external surface of the end faces of said tubes are coated with silica.

6. The apparatus defined in claim 1 including means for measuring the amount of light incident on said photosensitive element, said means being adapted for electrical connection to said apparatus.

7. An apparatus for detecting the opacity of a fluid, which comprises:

a hollow cruciform body having four openings arranged in a common plane and disposed 90 degrees about said body, one of said openings being adapted for connection to a fluid inlet conduit and another of said openings opposed 180 degrees from said inlet opening being adapted for connection to a fluid outlet conduit;

a pair of hollow cylindrical tubes having flat transparent end closures, one of said tubes being fluid-tightly mounted in each of said openings disposed 90 degrees from said inlet and said outlet openings, said tubes protruding inwardly into said body so that the transparent end faces of said tubes are in opposed spaced relationship;

means for adjustably mounting said tubes in said opposed openings so that the spacings between the opposed end faces of said tubes can be varied;

a light source mounted in one of said tubes; and a photosensitive element mounted in the other of said tubes.

8. The apparatus defined in claim 7 wherein said hollow tubes are glass cylinders having the transparent end closure formed integrally therewith.

9. The apparatus defined in claim 7 wherein the external surface of the end faces of said tubes are coated with silica.

10. The apparatus defined in claim 7 including means for measuring the amount of light incident on said photosensitive element, said means being adapted for electrical connection to said device.

11. The apparatus defined in claim 7 wherein said photosensitive element is a resistor, the resistance of which varies according to the amount of light incident thereon, and wherein said apparatus includes means responsive to the change in resistance of said photosensitive element, said means being adapted for electrical connection to said apparatus.

12. An apparatus for controlling the oil-water interface level in an oil water separator having a water drain line with an automatic shutoff valve therein, which comprises:

a hollow cruciform body having four openings arranged in a common plane and disposed 90 degrees about said body, one of said openings being adapted for connection to a fluid inlet conduit and another of said openings opposed 180 degrees from said fluid inlet opening being adapted for connection to a fluid outlet conduit;

a pair of hollow cylindrical tubes having flat transparent end closures, one of said tubes being fluid-tightly mounted in each of said openings disposed 90 degrees from said inlet and said outlet openings, said tubes protruding inwardly into said body so that the transparent end faces of said tubes are in opposed spaced relationship;

a light source mounted in one of said tubes;

a photosensitive element mounted in the other of said tubes, said photosensitive element comprising a resistor, the resistance of which varies according to the amount of light incident thereon;

means for withdrawing liquid from said separator at the interface level desired therein and conducting said withdrawn liquid to the fluid inlet of said cruciform body so that at least a portion of said withdrawn liquid passes between said opposed tubes; and control means responsive to the resistance of said photosensitive element for opening said shutoff valve in the water drain from said separator for a predetermined timed period.

13. The apparatus defined in claim 12 wherein said hollow tubes are glass cylinders having the transparent end closure formed integrally therewith.

14. The apparatus defined in claim 12 wherein the external surface of the end faces of said tubes are coated with silica.

15. The apparatus defined in claim 12 including means for adjustably mounting said tubes in said opposed openings so that the spacing between the opposed end faces of said tubes can be varied.

16. The apparatus defined in claim 12 including means for monitoring the liquid passing through said water drain and closing said water shutoff valve on the detection of the presence of oil therein.

17. The apparatus defined in claim 16 including means for actuating an alarm on the detection of oil in said water drain line.

18. The apparatus defined in claim 16 including means for reactivating said apparatus on again detecting the absence of oil in the water drain line following a shutdown caused by the presence of oil therein.

References Cited

UNITED STATES PATENTS

| | | | |
|---|---|---|---|
| 2,525,154 | 10/1950 | Taylor | 210—115 |
| 2,989,037 | 6/1961 | Filippino et al. | 210—96 X |
| 3,396,846 | 8/1968 | Hamilton | 210—114 X |
| 3,412,570 | 11/1968 | Pruett | 250—218 X |

REUBEN FRIEDMAN, Primary Examiner

JOHN ADEE, Assistant Examiner

U.S. Cl. X.R.

210—96, 112, 138; 250—218